(12) United States Patent
Yi et al.

(10) Patent No.: US 9,703,783 B2
(45) Date of Patent: Jul. 11, 2017

(54) CUSTOMIZED NEWS STREAM UTILIZING DWELLTIME-BASED MACHINE LEARNING

(71) Applicant: Yahoo! Inc., Sunnyvale, CA (US)

(72) Inventors: Xing Yi, Milpitas, CA (US); Scott Gaffney, Palo Alto, CA (US); Jean-Marc Langlois, Menlo Park, CA (US)

(73) Assignee: Yahoo! Inc., Sunnyvale, CA (US)

( * ) Notice: Subject to any disclaimer, the term of this patent is extended or adjusted under 35 U.S.C. 154(b) by 514 days.

(21) Appl. No.: 14/064,007

(22) Filed: Oct. 25, 2013

(65) Prior Publication Data

US 2015/0120712 A1    Apr. 30, 2015

(51) Int. Cl.
  *G06F 17/30* (2006.01)
(52) U.S. Cl.
  CPC .............................. *G06F 17/30053* (2013.01)
(58) Field of Classification Search
  CPC ......... G06F 17/30864; G06F 17/30867; G06F 17/30053
  USPC ........................................ 707/723, 728, 736
  See application file for complete search history.

(56) References Cited

U.S. PATENT DOCUMENTS

| | | | | |
|---|---|---|---|---|
| 2009/0327224 A1* | 12/2009 | White | ................ | G06F 17/30864 |
| 2010/0010890 A1* | 1/2010 | Ditkovski | .......... | G06Q 30/0242 705/14.41 |
| 2011/0054999 A1* | 3/2011 | Attenberg | ......... | G06F 17/30864 705/14.43 |
| 2011/0184925 A1* | 7/2011 | Muth | ................ | G06F 17/30864 707/706 |
| 2012/0304072 A1* | 11/2012 | Mercuri | ................. | G06Q 10/00 715/745 |
| 2013/0110824 A1* | 5/2013 | DeRose | ............ | G06F 17/30979 707/723 |

OTHER PUBLICATIONS

Liu et al, "Understanding Web Browsing Behaviors through Weibull Analysis of Dwell Time", ACM 978-1-60558-4/10/07, 8 pages.*
Agichtein et al, "Improving Web Search Ranking by Incorporating User Behavior Information", ACM 1-59593-7/06/2008, 8 pages.*

* cited by examiner

Primary Examiner — Rehana Perveen
Assistant Examiner — Loc Tran
(74) Attorney, Agent, or Firm — Martine Penilla Group, LLP (57) ABSTRACT

Methods, systems, and computer programs are presented for selecting news articles for presentation to a user. One method includes an operation for measuring dwelltimes for a first set of news items, where the dwelltime for a news item is based on the amount of time that the news item is displayed to a viewer. Further, the method includes an operation for training a classifier of news items based on the measured dwelltimes and based on features associated with the first set of news items. Additionally, the method includes an operation for ranking with the classifier a second set of news items for presentation to the user, the ranking also using the profile of the user for delivery of customized news to the user. The ranked second set of news item is then presented to the user.

15 Claims, 7 Drawing Sheets

CUSTOMIZED NEWS STREAM UTILIZING DWELLTIME-BASED MACHINE LEARNING

CROSS REFERENCE TO RELATED APPLICATIONS

This application is related by subject matter to U.S. patent application Ser. No. 13/843,433, filed Mar. 15, 2013, and entitled "Display Time of a Web Page"; U.S. patent application Ser. No. 13/843,504, filed Mar. 15, 2013, and entitled "Page Personalization Based on Article Display Time"; and U.S. patent application Ser. No. 14/012,932, filed Aug. 28, 2013, and entitled "Prioritizing Items from Different Categories in a News Stream", all of which are incorporated herein by reference.

BACKGROUND

1. Field of the Invention

The present embodiments relate to methods for providing news, and more particularly, methods, systems, and computer programs for providing a customized news stream to a user.

2. Description of the Related Art

The Internet has witnessed an explosive growth of online news. According to a recent report, more than 123 million people visited news websites such as Yahoo!™ News in May 2010, representing 57 percent of the total U.S. internet audience, with each visitor reading 43 pages on average. These numbers have been steadily increasing over the past years and show the growing appeal of reading news online.

Different people like different types of news content. In order to provide a better news-reading experience, some news websites recommend different types of media to users based on past behavior. Personalized news deliver a news stream to a user, according to the desires and use trends of the user. However, customizing the news stream is a complex problem because the number of news sources and the multiple types of available media continue to grow rapidly.

Recommending interesting news articles to users has become extremely important for internet news providers looking to maintain users' interest. While existing Web services, such as search providers, attract users' initial clicks, ways to engage users after their initial visit are largely under explored.

To provide custom news, some previous approaches have used article-click rates to measure the quality of news items, and the best news items are provided to users based on the clicked rates. However, click-based information does not provide an accurate measurement of article quality. For example, some articles that are presented on the top of the stream may receive more clicks but not have a high intrinsic quality value.

In search algorithms, click-through rates have proven valuable to identify webpages that tend to provide the best results for a given query. However, the same principle does not apply to news, as each user may prefer to view different set of news, and what might be top priority for a user may not be of interest to another user.

It is in this context that embodiments arise.

SUMMARY

Methods, devices, systems, and computer programs are presented for selecting news articles for presentation to a user. It should be appreciated that the present embodiments can be implemented in numerous ways, such as a method, an apparatus, a system, a device, or a computer program on a computer readable medium. Several embodiments are described below.

In one embodiment, a method for selecting news articles for presentation to a user is provided. The method includes an operation for measuring dwelltimes for a first plurality of news items, where the dwelltime is based on an amount of time that a selected news item is displayed to a viewer. In addition, the method includes another operation for training a classifier of news items based on the measured dwelltimes and based on a plurality of features associated with the first plurality of news items. A second plurality of news items for presentation to the user is ranked using the classifier, where the ranking is further based on the profile of the user to deliver customized news to the user. The method includes another operation for presenting one or more of the second plurality of news items to the user based on the ranking. In another embodiment, the operations of the method are executed by a processor.

In another embodiment, a method for selecting news articles for presentation to a user is presented. The method includes an operation for measuring dwelltimes for a first plurality of news items presented to viewers, where the dwelltime is based on an amount of time that a selected news item is displayed to a viewer. The method includes another operation for training a classifier of news items based on the measured dwelltimes and based on a plurality of features associated with the first plurality of news items. Further yet, the method includes operations for receiving a request for news items from the user, and for identifying a profile of the user. A second plurality of news items for presentation to the user is ranked using the classifier and the profile of the user, where the ranking prioritizes the second plurality of news items according to an expected interest of the user on each of the second plurality of news items. Additionally, the method includes operations for selecting one or more highest ranked news items from the second plurality of news items, and for providing the selected one or more highest ranked news items to the user. In another embodiment, the operations of the method are executed by a processor.

In yet another embodiment, a non-transitory computer-readable storage medium storing a computer program for selecting news articles for presentation to a user is presented. The computer-readable storage medium includes program instructions for measuring dwelltimes for a first plurality of news items, where the dwelltime is based on an amount of time that a selected news item is displayed to a viewer. The computer-readable storage medium further includes program instructions for training a classifier of news items based on the measured dwelltimes and based on a plurality of features associated with the first plurality of news items. Additional program instructions are provided for ranking a second plurality of news items for presentation to the user using the classifier, where the ranking is further based on a profile of the user for delivery of customized news to the user. Additional program instructions are included for presenting one or more of the second plurality of news items to the user based on the ranking.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

DETAILED DESCRIPTION

The following embodiments describe methods, devices, systems, and computer programs for selecting news articles for presentation to a user. It will be apparent, that the present embodiments may be practiced without some or all of these specific details. In other instances, well known process operations have not been described in detail in order not to unnecessarily obscure the present embodiments.

Figure 1:
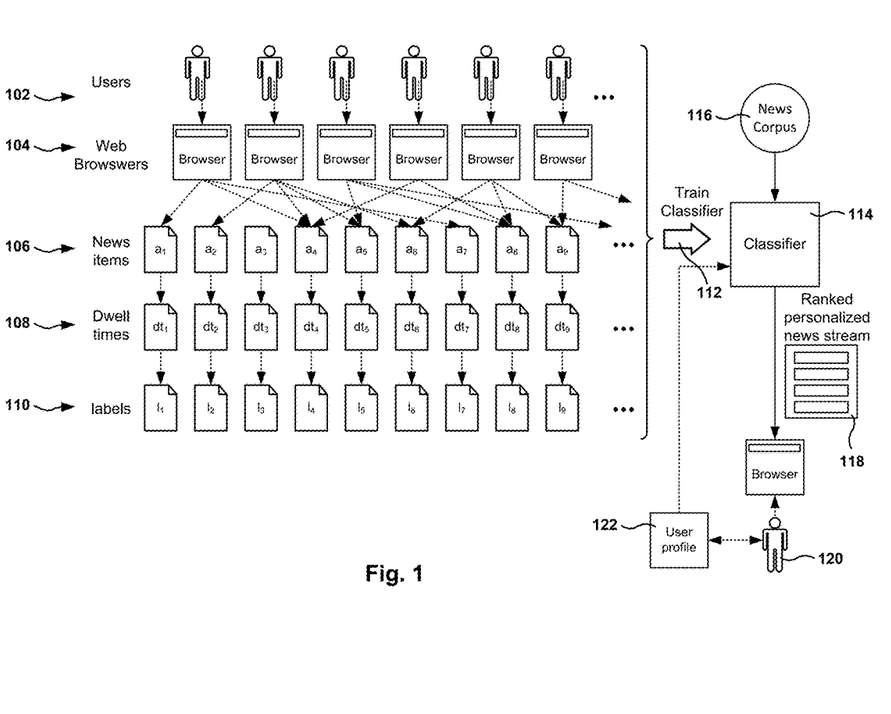
FIG. 1 illustrates a method for generating personalized news streams, according to one embodiment.

FIG. 1 illustrates a method for generating personalized news streams, according to one embodiment. As used herein, dwelltime refers to the amount of time that a user interacts with a news item. For example, the amount of time that the user spends reading a news item, or the amount of time that a user spends watching a news video. In one embodiment, the dwelltime is measured as the amount of time that a news item is presented to a user, which assumes that the user is interacting with the news item as long as the news item is presented to the user.

The dwelltime may also be referred to herein as dwell time, time spent, time of display, time between clicks, etc. In one embodiment, dwell time is defined as the amount of time that a webpage is physically displayed to a user. However, the dwell time may also be adjusted based on other factors, such as when a user leaves the computer unattended because the news item may be displayed for a long time, but the user is not actually accessing the news item. Therefore, the dwell time may be adjusted based on user activity to reflect the amount of time that the user is actually interacting with the news item.

Typically, when a user is viewing news on a news webpage, the user clicks on an article and the web browser moves to a different page to display the article. The user spends time reading the article and then returns to the news webpage. In one embodiment, dwell time measures the time difference between the time when the user clicked the article and the time when the user returned to the news webpage. Sometimes, users utilize different tabs on a browser to read news, by creating a new tab for a news item that the user wishes to read. The dwelltime is then measured by calculating the amount of time that the user spends accessing the tab for the news item. In general, any method might be used to calculate dwelltimes, as long as the measure is based on the amount of time that the user is actively engaged with the news item.

Users spend longer times on articles of interest to them, and less time on articles that are not interesting to them, either because the article is old, the user is not interested in the topic, the user has already read this article or another article with the same content, etc. Therefore, the dwelltime may be used as a metric for measuring the quality of a news item.

Embodiments presented herein utilize article-level dwelltime for training classifiers that use different Machine Learned Ranking (MLR) models. The classifiers are then utilized for ranking a corpus of news items in order to provide recommendations to users, and present a ranked list of news items to the user.

In one embodiment, users 102 access news items on a website using web browsers 104. It is noted that, the embodiments presented herein may also be used with any kind of program for accessing news. For example, a mobile device may utilize a news app to access Internet news. Therefore, dwelltimes may also be calculated for news applications.

When users 104 access news items 106, the dwelltimes associated with the access to each news item are measured, and a dwelltime value $dt_i$ 108 is assigned to each news item $a_i$ 106. More details regarding the calculation of dwell times are provided below with reference to FIG. 5. An offline evaluation dataset is created based on the dwelltimes $dt_i$ 108 for training 112 MLR ranking models for content-recommendation. Offline evaluation, as used herein, refers to the approach for assigning labels to news articles based on historical data about dwelltimes for other news articles.

The historical data is used to compute the dwelltimes. For example, if an article has been showed to users 100 times and the article has been clicked twice (with dwelltimes of 90 and 120 seconds), the dwelltime is calculated as the average of the dwelltimes obtain (e.g., 105 seconds). This dwelltime provides a measure of how interesting the article is to users. Of course, in real life testing, there can be thousands or even millions of data values regarding dwelltimes for news items.

Before training 112 the classifier 114, relevancy labels $l_i$ 110 are created for each of the articles, where these labels $l_i$ 110 provide an indication of interest of each (user, clicked article) pair. Any type of labeling strategy may be used to create the labels, as long as the labels are based on the respective dwelltimes. In one embodiment, the label $l_i$ is calculated with the following equation:

$$l_i = \text{int}(\log(dt_i + 1)) \quad (1)$$

Where $dt_i$ is the dwelltime for article $a_i$. Other embodiments may use other types of equations, such as making $l_i$ equal to the dwelltime $dt_i$, or $\max(K_1, \text{int}(\log(dt_i + 1)))$ with $K_1$ being a predefined integer to cap the number of possible different labels, or $\text{int}(dt_i)$, or $\max(K_2, \text{int}(dt_i))$, or $\max(K_3, \text{int}(10*\text{int}(dt_i)))$ [to categorize articles based on a tenth of a second of the dwelltime], etc. $K_1$, $K_2$, and $K_3$ are predetermined constants values.

Training the classifier 114 with the labels associated with the dwelltimes will cause the ranking algorithm to push to the top of the content stream articles with longer dwelltimes. More details about training classifier 114 are provided below with reference to FIG. 4.

After the classifier 114 has been trained, the classifier may be used to obtain a ranked personalized news stream 118 for a user 120. The classifier 114 utilizes at least two inputs: a news corpus 116 and a user profile 122. Therefore, the personalized news stream 118 is based on the user profile (e.g., desires, preferences, history, etc.) and the features found in the articles. Since the classifier has been trained with dwelltimes, the ranking based on article features will depend on how the features are appraised by the classifier according to the dwelltimes. In one embodiment, the features are derived from article content and user profile.

Of course, it is noted that other factors might be utilized when creating the personalized news stream 118, such as the features found in the articles, which may include one or more of dates, names of famous people, news category, etc. More details are provided below with reference to FIG. 4 regarding the analysis of features by the classifier 114.

Other MLR processes used for ranking utilize human judges to appraise the quality of an item. However, embodiments used herein rely on dwelltime instead of human judges, which provides savings in the time required to train a classifier, as well as the ability to appraise a much larger number of articles, since the process of measuring dwelltime may be automated and implemented with computing devices.

Further, in one embodiment, the calculated article-level dwelltimes are used to evaluate the performance of different ranking models, including machine-learned or manually tuned models.

It is noted that the embodiments illustrated in FIG. 1 are exemplary. Other embodiments may utilize different methods for accessing news, different ways of calculating dwelltimes, different ways of assigning labels, utilize different types of classifiers, etc. The embodiments illustrated in FIG. 1 should therefore not be interpreted to be exclusive or limiting, but rather exemplary or illustrative.

Figure 2:
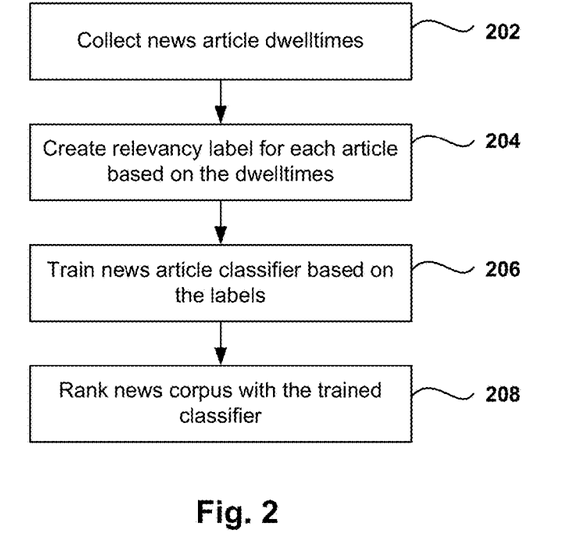
FIG. 2 is a flowchart illustrating an algorithm for selecting news articles utilizing machine learning and article dwell-time, in accordance with one embodiment.

FIG. 2 is a flowchart illustrating an algorithm for selecting news articles utilizing machine learning and article dwelltime, in accordance with one embodiment. While the various operations in this flowchart are presented and described sequentially, one of ordinary skill will appreciate that some or all of the operations may be executed in a different order, be combined or omitted, or be executed in parallel.

In operation 202, the news articles dwelltimes are collected. More details about the calculation of dwelltimes are provided below with reference to FIG. 5. In some embodiments, the dwelltimes may be adjusted based on parameters that take into account other factors. For example, in one embodiment the position within a news stream of the news article is taking into account, and if a news article that is presented with a low priority (e.g., not at the top of the news stream) is clicked by a user, the dwelltime for this article may be boosted to reflect that it was clicked while presented with low priority. For example, the dwelltime may be boosted by 10%, or utilize some other type of algorithm for boosting the dwelltime.

From operation 202, the method flows to operation 204 where relevancy labels are created for each of the articles. The relevancy labels are based on the dwelltime, and in one embodiment, the label is created utilizing equation (1) described above. Other embodiments may utilize other types of labeling methods, as long as the label is based on the dwelltime.

From operation 204, the method flows to operation 206 where the classifier of news articles is trained based on the assigned labels in operation 204. Different types of MLR may be used for ranking news. In one embodiment, several MLR methods are utilized and the results compared to determine the performance of the different MLR methods for ranking news articles utilizing dwelltimes, and some other features.

The dwelltime is an important metric about user engagement information and is integrated into the learning process of MLR for content recommendations. Testing of some the embodiments presented herein showed that the dwelltime-based approach makes the learning process more stable across different datasets, and also improves the offline evaluation performance for different datasets.

Further, from operation 206, the method flows to operation 208 where a customized news stream is provided to a user using, at least, the classifier, a corpus of news items, and the profile of the user.

Figure 3:
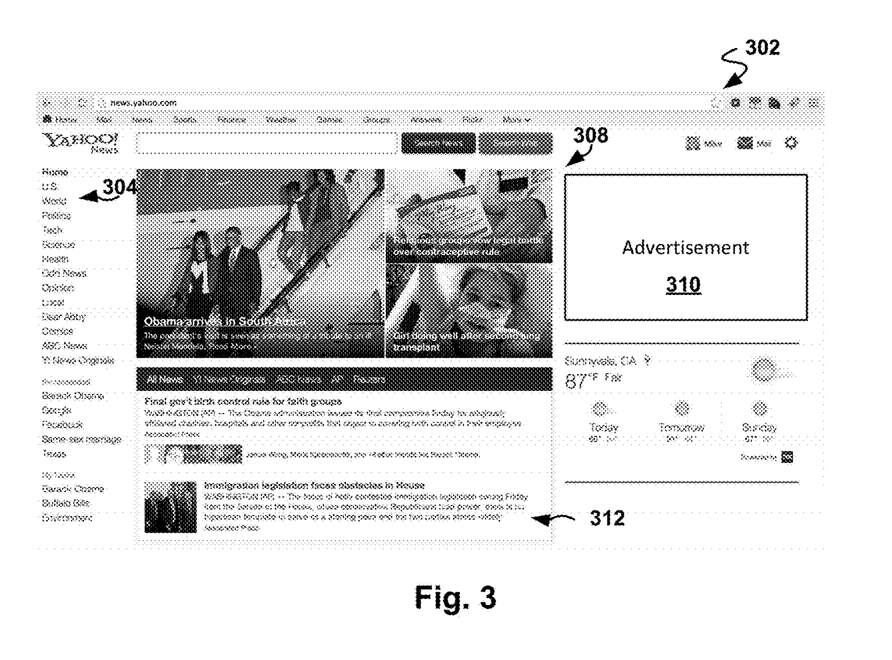
FIG. 3 shows a home page provided by an Internet news service, according to one embodiment.

FIG. 3 shows a home page provided by an Internet news service, according to one embodiment. In one embodiment, the online news page 302 includes a plurality of links 304, also referred to as tabs, each link being provided for the selection of a news topic. Examples of news topics include News, Sports, International, Finance, Food, Lifestyle, Technology, Travel, Shopping, Entertainment, etc. When the user selects one of the tabs, the news page displays the news articles related to the selected tab, except for the Home tab where the user is taken back to the news homepage.

The online news page 302 may also include a personalized news stream 312, an area for headline news or featured news 308, an advertisement area 310, etc. A personalized news stream includes a plurality of news items presented in a custom order for a user, where the custom order is based, at least, on user parameters. In addition, the sorting of the news item may be based on other factors, such as news item relevance, news item creation date, etc.

The user parameters used for sorting the personalized new streams may include one or more of user demographic data (e.g., gender, age, address, country, etc.), employment, interests, search history, news-reading history, user-configured topics of interest, hobbies, etc.

The personalized news stream 312 includes news items that may be of different types, such as news articles, videos, slideshows, tweets, blogs, photographs, etc. Embodiments presented herein automatically create a personalized news stream having items from different types, where the personalized news stream is custom made for the user accessing the news page.

In the past, click-based approaches have been used to rank the relevance of news items. However, when considering different types of media, click-based approaches do not provide good results when comparing news articles, videos, slideshows, etc.

Users will spend longer times on articles of interest to them, and less time on articles that are not interesting, either because the article is old, the user is not interested in the topic, the user has already read this article or another article with the same content, etc.

Advertisement dwell time has been used for pricing advertisement in websites, as the amount of time that the user views and ad is a good metric for charging advertisers. The dwell time may also be used to recommend news content to the user, and to determine how interested a user is in viewing news item within different categories of news items.

Embodiments presented herein describe methods for identifying news items of interest to a user based, at least, in the time spent reading news articles. It is noted that the embodiment illustrated in FIG. 3 is exemplary. Other embodiments may utilize different webpage layouts, additional or fewer sections, present the sections in different order, utilize different news topics, etc. The embodiments illustrated in FIG. 3 should therefore not be interpreted to be exclusive or limiting, but rather exemplary or illustrative.

Figure 4:
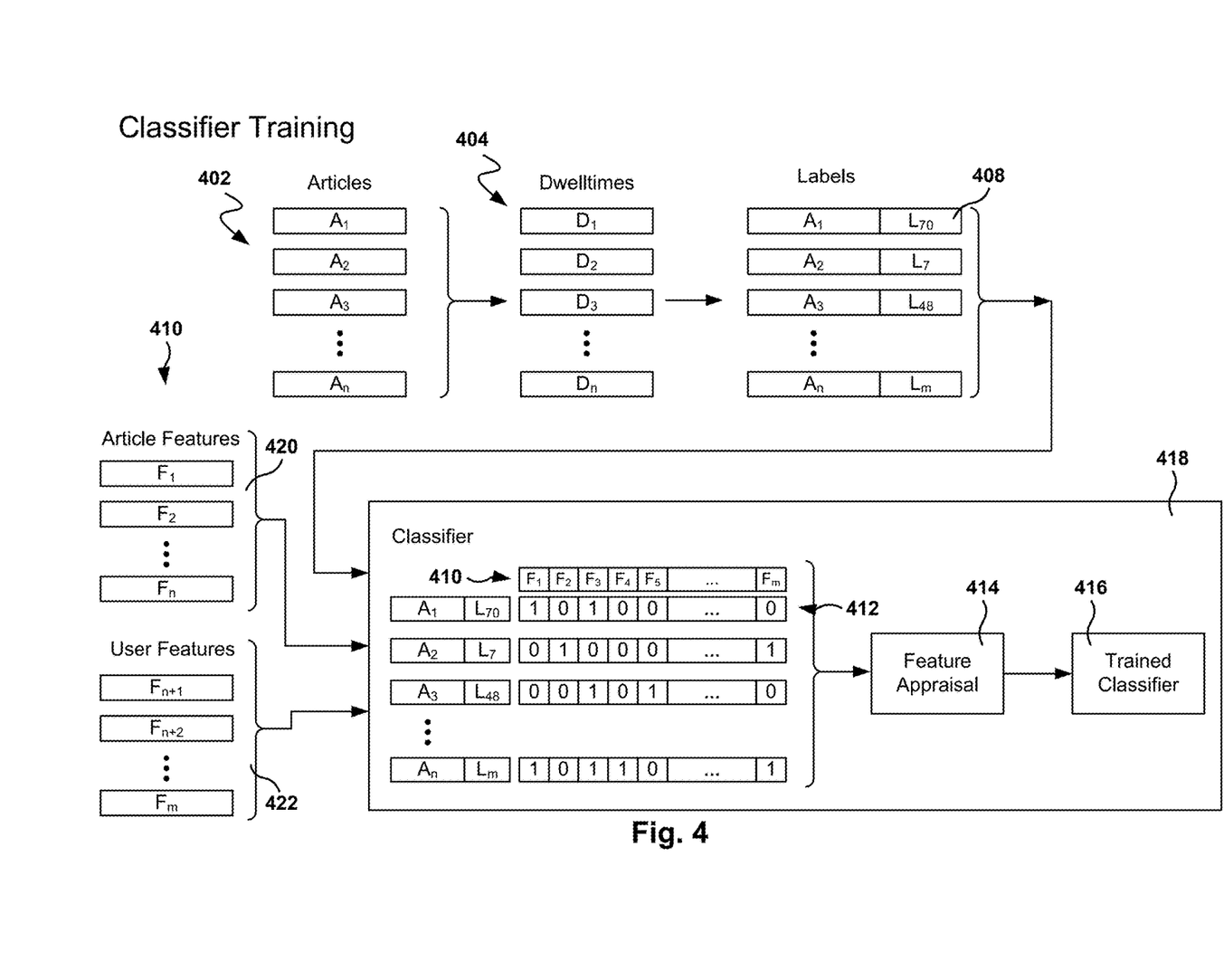
FIG. 4 illustrates a method for training a classifier, according to one embodiment.

FIG. 4 illustrates a method for training the classifier, according to one embodiment. In one embodiment, the classifier is a computer program that determines one or more ranking parameters for prioritizing news articles in a news stream. The classifier utilizes machine learning and relevance models to determine the one or more ranking parameters. In one embodiment, the classifier is a logistic regression classifier, but other type of classifiers may also be used.

Machine learning for search engines requires a rather straightforward approach because search results tend to be valuable or not, independently on the identity of the user that is searching. However with news, the straightforward approach does not work because different users, with different tastes and interests, are interested in different types of news articles.

To training the classifier, a plurality of dwelltimes $D_i$-$D_n$ 404 are calculated for a plurality of articles 402 $A_i$-$A_n$. Next, a plurality of labels $L_i$ 408 is calculated for the plurality of articles $A_i$ 402. In one embodiment, the labels are calculated utilizing equation (1) described above. In other embodiments, other labels are created that are based on dwelltimes $D_i$-$D_n$ 404.

In one embodiment, a plurality of features 410 $F_1$-$F_m$ are defined and input into classifier 418. The features 410 include features 420 related to article content, and features 422 related to user characteristics. Each feature 410 $F_i$, when found, increases the probability that the dwelltime of the article is improved according to user characteristics, i.e., the dwelltime for an article with that feature and for a particular user will be greater than an article without the feature, absent other considerations.

Each feature $F_i$ may have a different impact on the calculation of the probability, and during the training phase the classifier determines the relative importance for each of the features. Anything can be a feature for the classifier, e.g., articles read, names in the article, features in the article, organizations in the article, titles, user interests, user browsing history, etc.

For example, one of the article features may be defined as a date in the article. Another feature may be that a date towards the beginning of the article is within the last 48 hours. For example, a recent day in the article is a good indicator that the article is recent news, which means that the article will probably be more relevant that an older article. Other article features may be selected from the following group:

The article contains a date or a date reference (e.g., a date—Nov. 7, 2011, or January 2011; relative date—last month, Yesterday; name of a month—February; a year—2007; a day of the week—Monday; etc.)

The article contains a time related word or a word for measuring time (e.g., ago, days, weeks, months, years, etc.)

The article has capitalized words in the middle of the sentence (e.g., President Obama, John Lennon, Congress)

The article includes sentences in the past tense (e.g., the victim was last seen when leaving the supermarket)

One or more verbs refer to an action (e.g., drove, died)

The article contains a proper name (e.g. Michael, The Beatles)

The article contains the name of a celebrity (e.g., Lady Gaga, Elton John, Michael Jordan)

The article contains the name of a media outlet (e.g., NBC, CNN, NY Times, Reuters, etc.)

The article contains words indicative of telling a story (e.g., reported, according to, said, announced, indicated, explained, etc.)

The article contains words often found in news reports (e.g., accident, car crash, police, lawyer, divorce, press conference, announcement, dollars, stock market, recession, etc.)

The article contains the name of a crime or a word related to a crime (e.g., kill, kidnap, assault, robbery, lawyer, bounty, dead, death, injured, hospital, charged, arrested, drunk, etc.)

The article contains a title (e.g., President, CEO, Coach, Principal, Doctor, etc.)

etc.

As user accesses the news stream, the user accesses items of different types, such as news articles, videos, slideshows, etc. Over time, the activity of the user is tracked by the system in order to create a profile 122 (FIG. 1) that assists the news stream personalization module to deliver news items to the user that are most likely to be of interest to the user. The items in the new stream are sorted according to the perceived value of the item for the user. The goal is to recommend items within the news stream according to the perceived value for the user.

In one embodiment, as an individual interacts with a software application, e.g., an instant messenger or electronic mail application, descriptive content may be identified. The descriptive content may be in the form of signals or stored physical states within memory, such as, for example, an email address, instant messenger identifier, phone number, postal address, message content, date, time, etc. The descriptive content may be stored, typically, along with contextual content. For example, how a phone number came to be identified (e.g., it was contained in a communication received from another via an instant messenger application) may be stored as contextual content associated with the phone number. Contextual content, therefore, may identify circumstances surrounding receipt of a phone number (e.g., date or time the phone number was received) and may be associated with descriptive content. Contextual content, may, for example, be used to subsequently search for associated descriptive content. For example, a search for phone numbers received from specific individuals, received via an instant messenger application or at a given date or time, may be initiated.

A profile builder may initiate generation of a profile for users of an application, including search engine users, for example. A profile builder may initiate generation of a user profile for use, for example, by a user, as well as by an entity that may have provided the application. For example, a profile builder may enhance relevance determinations and thereby assist in indexing, searching or ranking search results. Therefore, a search engine provider may employ a profile builder, for example.

A variety of mechanisms may be implemented to generate a profile including, but not limited to, collecting or mining navigation history, stored documents, tags, or annotations, to provide a few examples. A profile builder may store a generated profile. Profiles of users of a search engine, for example, may give a search engine provider a mechanism to retrieve annotations, tags, stored pages, navigation history, or the like, which may be useful for making relevance determinations of news streams or search results, such as with respect to a particular user.

The dwell time contributes to the determination of what kind of news the user wants. For example, if a user spends watching sports news 10% more time than when watching other types of content, the dwell time is used to determine an interest of the user in sports. Similarly, if the user spends 10% less time, on average, on financial news, the financial topics will have a lower score when calculating the news stream. In other words, the dwell time provides a normalized user engagement level for different types of news categories, as well as news topics.

In one embodiment, user features 422 may be selected from the following group:
Age
Gender
Address
Click history
News read
Frequency of articles read for each news category
Searches
Dwell times for articles read
User interests defined on a social network
Social relationships of user
Occupation
Education
etc.

The list of features recited above is exemplary, and other embodiments may utilize different features, or a subset of these features. The feature list should therefore not be interpreted to be exclusive or limiting, but rather exemplary or illustrative.

The features 410, the articles 402, and the labels 408 are input to the classifier 418. For each article, the classifier determines if each of the features is present (which is represented in FIG. 4 as a logical value of 1 when a feature is present, and a value of 0 when the feature is missing).

In the feature appraisal phase, the classifier utilizes machine learning algorithms to compare the presence of each of the features in the article or the user characteristics with the scores of the article. The result of the feature appraisal is a trained classifier, which includes an assessment of the value of each of the features $F_1$-$F_m$ for predicting if an article will be of interest to a particular user. In addition, the trained classifier also evaluates the importance of finding combinations of features within an article.

Different MLR models rankers can be used for classifying news. For example, the classifier may be one of RankNet (C. J. C. Burges, T. Shaked, E. Renshaw, A. Lazier, M. Deeds, N. Hamilton and G. Hullender, "Learning to rank using gradient descent"), RankBoost (Y. Freund, R. Iyer, R. Schapire, and Y. Singer, "An efficient boosting algorithm for combining preferences"), AdaRank (J. Xu and H. Li. AdaRank, "A boosting algorithm for information retrieval"), linear feature-based models for ranking (D. Metzler and W. B. Croft, "Linear feature-based models for information retrieval" or Information Retrieval, Q. Wu, C. J. C. Burges, K. Svore and J. Gao, "Adapting Boosting for Information Retrieval Measures"), GBDT (J. H. Friedman. Greedy function approximation, "A gradient boosting machine"), List-Net (Z. Cao, T. Qin, T. Y. Liu, M. F. Tsai, and H. Li, "Learning to Rank: From Pairwise Approach to Listwise Approach"), etc.

Figure 5:
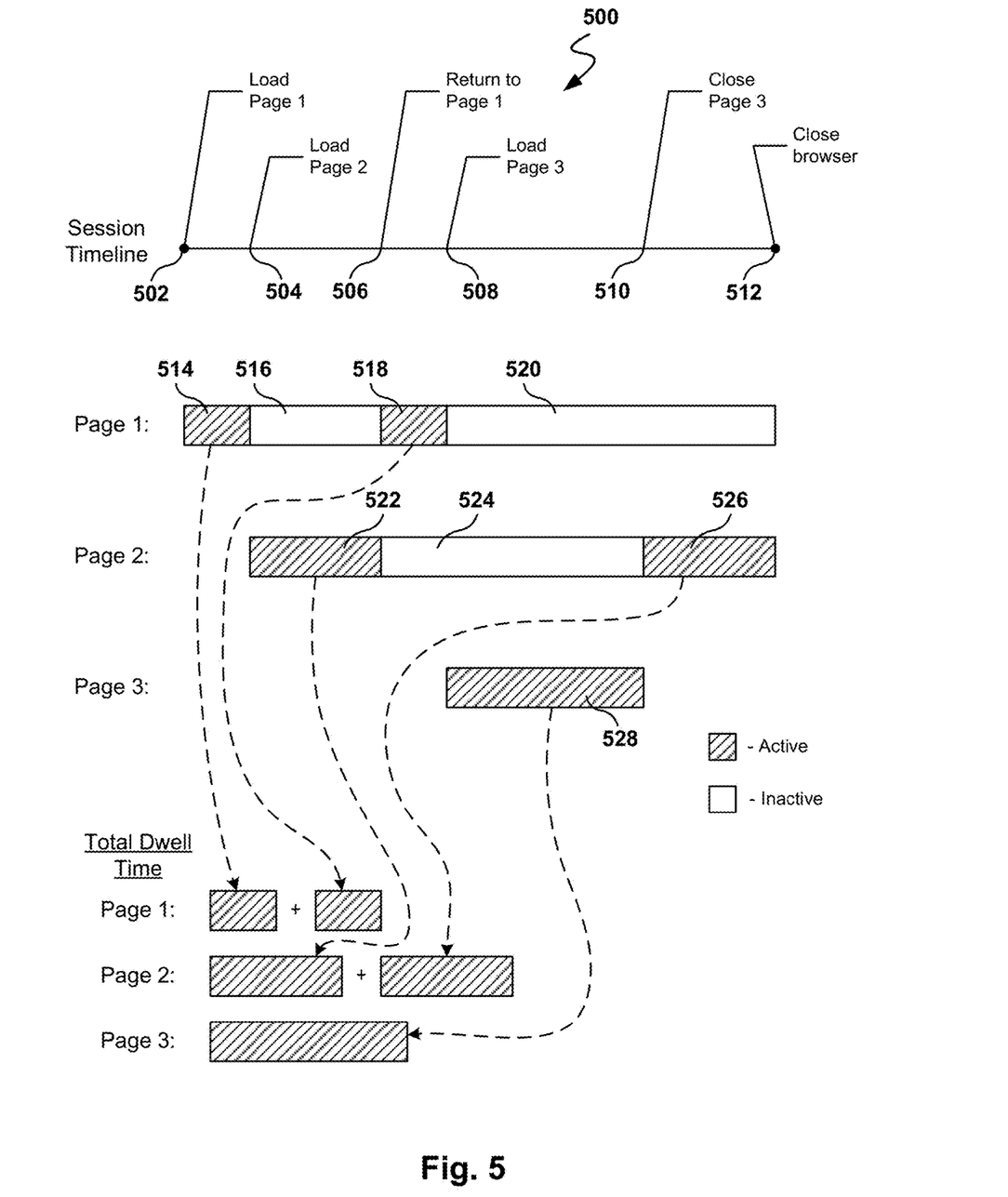
FIG. 5 conceptually illustrates the determination of dwell time for multiple pages having multiple periods of display, in accordance with one embodiment.

FIG. 5 conceptually illustrates the determination of dwell time for multiple pages having multiple periods of display, in accordance with one embodiment. By determining accurate measurements of dwell time, it is possible to discover users' interests and build better user interest profiles for article recommendation or ad selection.

A timeline 500 is representative of a user's session interfacing with various pages via a browser. At time 502 the browser is opened and Page 1 is opened for viewing in a first tab of the browser. At time 504, Page 2 is loaded in a second tab of the browser for viewing by the user. At time 506, the user returns to viewing Page 1 in the first tab. At time 508, Page 3 is loaded in a third tab of the browser. At time 510, the third tab containing Page 3 is closed and the user returns to view Page 2 in the second tab. At time 512, the browser is closed, thereby closing the first and second tabs and ending the user's browsing session.

It is noted, that the embodiment of FIG. 5 calculates dwelltime based on the use of tab browsing. However, the principles presented herein may also be utilized with users that view news articles within the same webpage, i.e., clicking on a news article, reading the news article, and then returning to the news page, or in any other way (e.g., utilizing a news app in a mobile device).

The total time of availability of Page 1 (the time Page 1 was open and available for possible viewing, regardless of whether Page 1 was actually displayed or not) spans the time period from time 502 to time 512, as the first tab was open for the entire time that the browser was open. During time period 514, defined between time 502 and time 504, Page 1 was actively displayed. During time period 516, defined between time 504 and time 506, Page 1 was hidden. Subsequently, during time period 518, defined between time 506 and time 508, Page 1 was displayed again. And during time period 520, defined between time 508 and time 512, Page 1 was hidden. Thus, the total display time for Page 1 is defined by the sum of time periods 514 and 518.

The total time of availability of Page 2 spans the time period from time 504 to time 512, as the second tab was opened at time 504 and was not closed until the browser was closed at time 512. During time period 522, defined between time 504 and time 506, Page 2 was actively displayed in the second tab. During time period 524, defined between time 506 and time 510, Page 2 was hidden from view. And during time period 526, defined between time 510 and time 512, Page 2 was displayed again as the user returned to view the second tab. Thus, the total display time for Page 2 is defined by the sum of the time intervals 522 and 526.

The total time of availability for Page 3 is the same as its total display time, as Page 3 was opened in the third tab and subsequently the third tab was closed. Thus, the total display time of Page 3 is the time period 528 defined between time 508 and time 510.

It will be appreciated that the time interval 516, during which Page 1 was hidden, corresponds to the time interval 522 during which Page 2 was displayed. The time interval 520, during which Page 1 was hidden, corresponds to the sum of the time intervals 528 and 526, during which Pages 3 and 2 were displayed, respectively. And the time interval 524, during which Page 2 was hidden, corresponds to the sum of the time intervals 518 and 528, during which Pages 1 and 3 were respectively displayed.

The approximate display time for a page can be determined by logging certain events and analyzing time intervals between these events. Broadly speaking, a log of an event includes the type of event that occurred and a corresponding timestamp indicating the time at which the event occurred.

Offline evaluation experiments showed that a dwelltime-based learning strategy achieves better performance than a learning model based on click information. Experiments regarding offline machine learning training and evaluation, the dwelltime-based news recommendation approach performed better than the click-based approach. Additionally, the dwelltime-based news recommendation approach improves user engagement and increases traffic.

Using dwelltime-based labels, evaluation metrics, such as NDCG and NDCG@k, may be calculated. Discounted cumulative gain (DCG) is a measure of effectiveness of a Web search engine algorithm or related applications, often used in information retrieval. Using a graded relevance scale of documents in a search engine result set, DCG measures the usefulness, or gain, of a document based on its position in the result list. The gain is accumulated from the top of the result list to the bottom with the gain of each result discounted at lower ranks.

Search result lists vary in length depending on the query. Comparing a search engine's performance from one query to the next cannot be consistently achieved using DCG alone, so the cumulative gain at each position for a chosen value of p should be normalized across queries. Normalized DCG (NDCG) sorts documents of a result list by relevance, producing the maximum possible DCG till position p, also called Ideal DCG (IDCG) till that position. The NDCG values for all queries can be averaged to obtain a measure of the average performance of a search engine's ranking algorithm. In a perfect ranking algorithm, the $DCG_p$ will be the same as the $IDCG_p$ producing an nDCG of 1.0. All nDCG calculations are then relative values on the interval 0.0 to 1.0 and so are cross-query comparable.

In one embodiment, the NDCG computation is calculated for item k at position i as (dwelltime_label(k)+1)/ln(i+1), where i starts at 1. Then DCG, NDCG, NDCG@k, etc., are calculated for evaluating the performance of different recommendation systems.

The testing results show that ranking with dwelltimes is better than the binary approach for click-based systems. In one test, even when the learning fails using the click binary-label, the learning still succeeds using the dwelltime-based label. Further, the dwelltime-based approach can learn the pair-wise preference while binary-approach mostly fails to learn from pair-wise preference information.

During testing, in the offline benchmark data, each user forms a query. All of the user's clicked articles are included in one query. Therefore, the ranking and evaluation is based on all documents viewed by the same user in a week. Therefore, the documents are ranked for each user, the ranking evaluation score is computed for each user, and then the average score across all users is obtained. This is how the MAP, NDCG, P@k, NDCG@k, and AUC results were evaluated.

During testing, it was deduced that using the dwelltime labeling approach, the machine can find parameters that improve both NDCG and MAP from the sscontrol dataset. Further, introducing dwelltime labels can also make the learning process more stable across different datasets.

Figure 6:
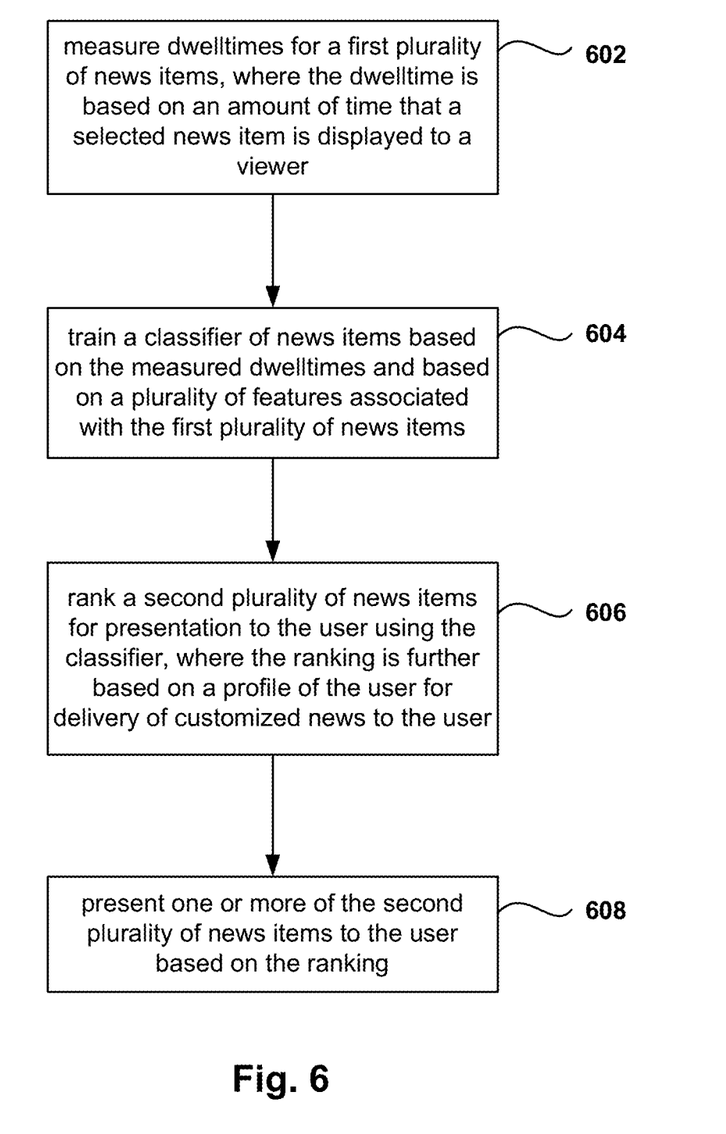
FIG. 6 is a flowchart illustrating an algorithm for selecting news articles for presentation to a user, in accordance with one embodiment.

FIG. 6 is a flowchart illustrating an algorithm for selecting news articles for presentation to a user, in accordance with one embodiment. While the various operations in this flowchart are presented and described sequentially, one of ordinary skill will appreciate that some or all of the operations may be executed in a different order, be combined or omitted, or be executed in parallel.

In operation 602, the dwelltimes for a first plurality of news items are measured, where the dwelltime is based on the amount of time that a selected news item is displayed to a viewer. From operation 602, the method flows to operation 604 where a classifier of news items is trained based on the measured dwelltimes and based on a plurality of features associated with the first plurality of news items.

From operation 604, the method flows to operation 606 where a second plurality of news items for presentation to the user are ranked using the classifier. The ranking is further based on the profile of the user for delivery of customized news to the user.

From operation 606, the method flows to operation 608 where one or more of the second plurality of news items are presented to the user based on the ranking obtained in operation 606.

Figure 7:
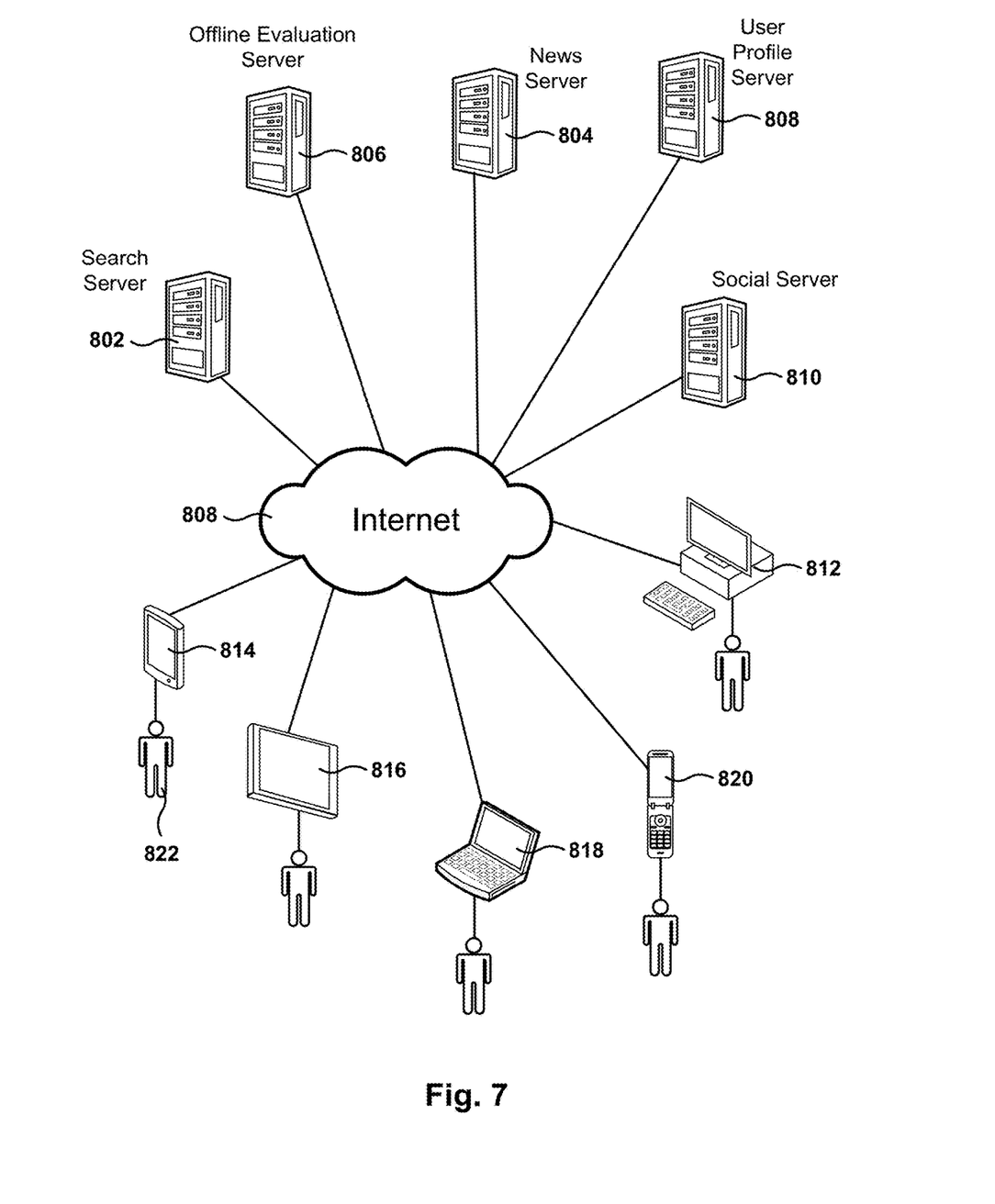
FIG. 7 is a simplified schematic diagram of a computer system for implementing embodiments of the present disclosure.

FIG. 7 is a simplified schematic diagram of a computer system for implementing embodiments of the present disclosure. Internet 808 is used to interconnect users with servers. Users 822 access Internet 808 via a variety of devices, such as smart phone 814, tablet 816, laptop 818, mobile phone 820, personal computer 812, etc. These are merely examples, and any other device used to access Internet 808 can be used to implement embodiments of this disclosure. For example, the devices may be wired or wireless. In one embodiment, a browser is executed on a device, and the graphical user interface is presented on a display. The browser provides the functionality for accessing the Internet.

Search server 802, also known as a web search engine, provides search features to Internet users. A web search engine is designed to search for information on the World Wide Web. The search results are generally presented in a list of results and are sometimes called hits. The information may consist of web pages, news pages, blogs pages, images, etc. Unlike web directories, which are maintained by human editors, search engines operate algorithmically, or use a mixture of algorithmic and human input.

News server 804 provides news to users. One example of a news server is Yahoo!® News. News may originate from a variety of sources, not just from inside the search engine website. The news search engine scouts the Internet looking for news articles, which are then made available to users. Users may access the news by selecting news articles in the website of the news search engine, searching the news by entering search terms in a search field, or selecting a news category, such as politics, sports, weather, etc.

Offline Evaluation server 806 evaluates offline datasets for training MLR ranking models. Offline Evaluation server 806 may utilize information from news server 804, search server 802, social server 810, etc. Social Server 810 provides social network services to Internet users.

User Profile Server 808 builds user profiles for users utilizing new services. The profiles are based on user activity and user characteristics, but other factors may also be considered.

Although different servers are described by way of example, the person skilled in the art will appreciate that multiple configurations are possible by combining several servers into one system, by having distributed systems where a single function can be accomplished by a plurality of different servers scattered across the Internet, or by caching information from the different databases at the different servers to accelerate the processing of information.

Figure 8:
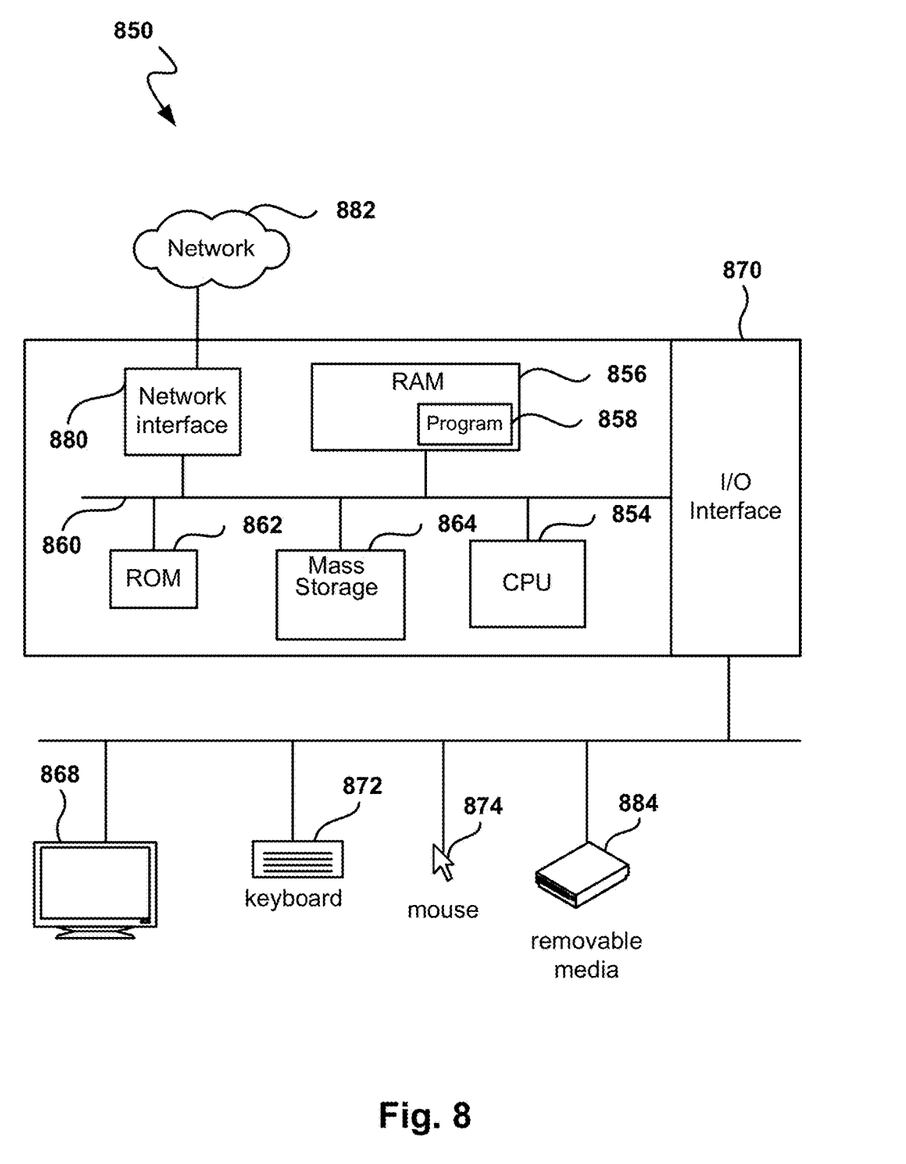
FIG. 8 is a simplified schematic diagram of a computer system for implementing embodiments of the present disclosure.

FIG. 8 is a simplified schematic diagram of a computer system for implementing embodiments of the present disclosure. It should be appreciated that the methods described herein may be performed with a digital processing system, such as a conventional, general-purpose computer system. Special purpose computers, which are designed or programmed to perform only one function, may be used in the alternative. The computer system includes a central processing unit (CPU) 1104, which is coupled through bus 1110 to random access memory (RAM) 1106, read-only memory (ROM) 1112, and mass storage device 1114. Computer program 1108 for searching relevant news articles resides in random access memory (RAM) 1106, but can also reside in mass storage 1114.

Mass storage device 1114 represents a persistent data storage device such as a floppy disc drive or a fixed disc drive, which may be local or remote. Network interface 1130 provides connections via network 1132, allowing communications with other devices. It should be appreciated that CPU 1104 may be embodied in a general-purpose processor, a special purpose processor, or a specially programmed logic device. Input/Output (I/O) interface provides communication with different peripherals and is connected with CPU 1104, RAM 1106, ROM 1112, and mass storage device 1114, through bus 1110. Sample peripherals include display 1118, keyboard 1122, cursor control 1124, removable media device 1134, etc.

Display 1118 is configured to display the user interfaces described herein. Keyboard 1122, cursor control 1124, removable media device 1134, and other peripherals are coupled to I/O interface 1120 in order to communicate information in command selections to CPU 1104. It should be appreciated that data to and from external devices may be communicated through I/O interface 1120. The embodiments can also be practiced in distributed computing environments where tasks are performed by remote processing devices that are linked through a wire-based or wireless network.

Embodiments of the present disclosure may be practiced with various computer system configurations including hand-held devices, microprocessor systems, microprocessor-based or programmable consumer electronics, minicomputers, mainframe computers and the like. The embodiments may also be practiced in distributed computing environments where tasks are performed by remote processing devices that are linked through a network.

With the above embodiments in mind, it should be understood that the embodiments can employ various computer-implemented operations involving data stored in computer systems. These operations are those requiring physical manipulation of physical quantities. Any of the operations described herein that form part of the embodiments are useful machine operations. The embodiments also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data may be processed by other computers on the network, e.g., a cloud of computing resources.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A computer-implemented method for selecting news articles for presentation on a user device of a user, the method comprising:
   measuring dwelltimes for a first plurality of news items, the measured dwelltimes based on an amount of time that each of the first plurality of news item is determined to have been displayed on the user device, each of the first plurality of news items having a plurality of features associated therewith;
   training a classifier for determining one or more ranking parameters for ranking news items based on the measured dwelltimes and based on the plurality of features associated with the first plurality of news items, the training including calculating a relative importance of respective features for increasing measured dwelltimes, wherein the one or more ranking parameters are at least based upon a feature determined to have a higher importance than other features of the plurality of features for increasing measured dwelltimes;
   ranking a second plurality of news items for presentation on the user device using the one or more ranking parameters determined by the classifier; and
   sending one or more of the second plurality of news items to be presented on the user device based on the ranking, wherein the one or more ranking parameters being based upon the feature determined to have higher importance than other features for increasing dwelltimes enables sending of news items expected to increase dwelltimes for the user of the user device.

2. The method as recited in claim 1, wherein training the classifier further includes:
   assigning labels to each news item from the first plurality of news items; and
   training the classifier based on the assigned labels.

3. The method as recited in claim 2, wherein assigning labels further includes:
   making a news item label equal to the dwelltime for the respective news item.

4. The method as recited in claim 2, wherein assigning labels further includes:
   making a news item label equal to an integer part of a log of a sum of the dwelltime and 1.

5. The method as recited in claim 2, wherein assigning labels further includes:
   making a news item label equal to an integer part of a log of a sum of the dwelltime and 1; and
   truncating the news item label to a predetermined value if the news item label is greater than the predetermined value.

6. The method as recited in claim 1, wherein the first plurality of news items includes news articles, videos, slideshows, tweets, blogs, or photographs.

7. The method as recited in claim 1, wherein features include any detectable property, marker, indicator, or attribute of a news item.

8. The method as recited in claim 1, wherein the ranking is further based on a profile of the user, the profile including features of interest for the user based on items viewed by the user.

9. The method as recited in claim 1, further including:
training the classifier of news items based on user characteristics, wherein the user characteristics include one or more of gender, or age, or address, or occupation, or online-activity history.

10. The method as recited in claim 1, wherein the features include one or more of dates, or names, or keywords, or phrases, or people, or publisher, or location.

11. A non-transitory computer-readable storage medium storing a computer program for sending news articles for presentation to a user device of a user, the non-transitory computer-readable storage medium comprising:
program instructions for measuring dwelltimes for a first plurality of news items, the measured dwelltimes based on an amount of time that respective news items of the first plurality of news items are determined to have been displayed on the user device, each of the first plurality of news items having a plurality of features associated therewith;
program instructions for training a classifier for determining one or more ranking parameters for ranking news items based on the measured dwelltimes and based on the plurality of features associated with the first plurality of news items, the training including calculating impact factors of respective features for increasing measured dwelltimes, wherein the one or more ranking parameters are at least partially based upon a feature determined to have a greater impact factor than other features of the plurality of features for increasing measured dwelltimes;
program instructions for ranking a second plurality of news items for presentation on the user device using the one or more ranking parameters determined by the classifier; and
program instructions for sending one or more of the second plurality of news items to be presented on the user device based on the ranking, wherein the one or more ranking parameters being based upon the feature determined to have the greater impact factor for increasing dwelltimes enables sending of news items expected to increase dwelltimes for the user of the user device.

12. The non-transitory computer-readable storage medium storing a computer program as recited in claim 11, wherein training the classifier further includes:
assigning labels to each news item from the first plurality of news items, wherein assigning labels includes making a news item label equal to the dwelltime for the respective news item; and
training the classifier based on the assigned labels.

13. The non-transitory computer-readable storage medium storing a computer program as recited in claim 12, wherein assigning labels further includes:
making a news item label equal to an integer part of a log of a sum of the dwelltime and 1.

14. The non-transitory computer-readable storage medium storing a computer program as recited in claim 12, wherein assigning labels further includes:
making a news item label equal to an integer part of a log of a sum of the dwelltime and 1; and
truncating the news item label to a predetermined value if the news item label is greater than the predetermined value.

15. The non-transitory computer-readable storage medium storing a computer program as recited in claim 11, wherein measuring dwelltimes further includes:
measuring the dwelltime utilizing one of web beacons or utilizing focus and blur of user browsing activities.

* * * * *